United States Patent [19]

Jack

[11] Patent Number: 6,080,346
[45] Date of Patent: Jun. 27, 2000

[54] EXTRUSION APPARATUS AND METHOD AND EXTRUDED THERMOPLASTIC POLYMER

[75] Inventor: Raymond Leslie Jack, Upholland, United Kingdom

[73] Assignee: British Technology Group Inter-Corporation LIC LIM, London, United Kingdom

[21] Appl. No.: 08/765,871

[22] PCT Filed: Aug. 3, 1995

[86] PCT No.: PCT/GB95/01845

§ 371 Date: Jan. 10, 1997

§ 102(e) Date: Jan. 10, 1997

[87] PCT Pub. No.: WO96/04121

PCT Pub. Date: Feb. 15, 1996

[30] Foreign Application Priority Data

Aug. 3, 1994 [GB] United Kingdom .................. 9415720

[51] Int. Cl.⁷ .......................... B29C 47/00; B29C 47/60
[52] U.S. Cl. ............... 264/143; 264/211.21; 264/211.22; 264/211.24; 366/79; 366/89; 366/318; 366/322; 366/323; 366/343; 425/143; 425/200; 425/203; 425/208; 425/209; 425/378.1; 425/378.2; 425/382.2

[58] Field of Search ................................ 264/143, 211.21, 264/211.22, 211.24; 425/143, 200, 203, 208, 209, 378.1, 378.2, 382.2; 366/79, 89, 318, 322, 323, 343

[56] References Cited

U.S. PATENT DOCUMENTS

| 3,564,651 | 2/1971 | Convington, Jr. et al. ............. 366/343 |
| 4,309,115 | 1/1982 | Klein et al. .............................. 366/79 |
| 4,478,971 | 10/1984 | Ballard ................................. 524/376 |
| 4,493,807 | 1/1985 | Vyvial et al. .......................... 264/101 |

FOREIGN PATENT DOCUMENTS

| 0 078 515 | 5/1983 | European Pat. Off. . |
| 0 080 664 | 6/1983 | European Pat. Off. . |
| 0 273 755 | 7/1988 | European Pat. Off. . |
| 0 532 037 A1 | 3/1993 | European Pat. Off. . |
| 1284924 | 2/1962 | France . |

*Primary Examiner*—Leo B. Tentoni
*Attorney, Agent, or Firm*—Nixon & Vanderhye

[57] ABSTRACT

Polyvinyl alcohol is processed into fiber or pellets for further processing, or directly into water-soluble film, in a screw-and-barrel extruder, which has a slow temperature rise and a mild kneading action achieved by a non-stick coating applied to the screw.

23 Claims, 2 Drawing Sheets

EXTRUSION APPARATUS AND METHOD AND EXTRUDED THERMOPLASTIC POLYMER

This invention relates to an extrusion and moulding apparatus and method, and more particularly to an apparatus and method for use in the extrusion or moulding of polymeric articles and materials, e.g. polymeric sheets, films and other forms. It extends to a polymer per se with certain novel properties.

BACKGROUND OF THE INVENTION

Single and multiple (e.g. twin) screw feeder apparatus is known, whereby a composition of an organic polymer can be delivered to a die or mould assembly for extrusion or moulding. The screw or screws are housed in a barrel and rotate so that the screw flights carry the composition along the barrel. It is also known that the root diameter of the shaft of such screws can vary along the length of the screw, so that the composition can be subjected, during its journey along the barrel, to varying degrees of compression and heating, which are necessary to prepare the material for extrusion or moulding.

Some organic polymers are more susceptible than others to damage from such compression, especially if they are excessively chopped and broken up. For example, certain grades of polyvinyl alcohol can degrade, leading to a cloudy, hard product where a clear flexible film might have been intended. This degradation has been attributed to cross-linking. It would therefore be desirable to pass such material through such heating and working zones as are necessary but without breaking it up.

Multilayered co-extruded films can be made by providing a plurality of such apparatuses in parallel, with means for uniting the parallel newly extruded films, which would typically have different but carefully coordinated properties, as described in for example International Application PCT/WO93/22125.

SUMMARY OF THE INVENTION

The present invention provides in one aspect the improvement whereby a screw for delivering such compositions to a die or mould is coated over at least part of its surface with an adhesion-reducing coating.

According to the present invention, a barrel screw feeder apparatus for delivering an organic polymer composition (such as polyvinyl alcohol (PVOH) or polyalkylene with optional slip agents and optional plasticisers) to a die or mould is characterised by a (single or multiple) screw exhibiting less adhesion to the composition than does the barrel. The screw may, over at least part and preferably over substantially all of its surface, have a room temperature adhesion strength to polyvinyl alcohol cast thereon of less than 200 kPa, preferably not exceeding 100 kPa, more preferably not exceeding 50 kPa. Such an adhesion-reducing surface may be inherent to the material of which the screw is made or may be a coating, which is preferably a non-stick rather than a specifically slippery coating, and may be e.g. a fluorocarbon and is preferably serviceable up to at least 240° C. Preferably the die and/or the barrel are also coated, with preferably a coating which is both non-stick and slippery, the barrel in such a case having a higher coefficient of friction against PVOH than has the screw, although the opposite is also conceivable (barrel more slippery than the screw). When, in this specification, PVOH is mentioned as a reference material, or as a specific feedstock, it is taken to have a molecular mass (number-average) of 100000–120000 and (weight-average) of 200000–300000.

The coefficient of dynamic friction of the screw surface measured against polyvinyl alcohol at room temperature may be less than 0.2 and is preferably less than 0.15, more preferably less than 0.12, most preferably less than 0.11, and can be as low as 0.06. (A screw of uncoated steel, by way of comparison, would have a coefficient of friction of 0.34 and bond strength 540 Newtons per square inch i.e. 865 kPa.)

The coefficient of dynamic friction of the die surface measured against polyvinyl alcohol at room temperature may be less than 0.2 and is preferably less than 0.15, e.g. less than 0.13, in order to minimise back-pressure at the die. The adhesion strength of PVOH cast on the die surface is preferably less than 150 kPa, more preferably under 80 kPa, preferably less than 50 kPa. The die may be a spider die with a mandrel over which the product is drawn to form a tubular film or extruded as 6 mm diameter fibre(s) drawn to 3 mm and chopped into pellets for re-processing.

The invention extends to a method of processing an organic polymer composition in apparatus as set forth above. The composition may comprise polyvinyl alcohol. Preferably, the work done in passing composition through the barrel and through the die does not exceed (in either case) one-quarter, or more preferably one-eighth, of the work done passing the same composition through a barrel or die of uncoated steel.

The coating(s) lessen the mechanical energy expended in transporting the material through the barrel and especially in shear damage. This in turn means that the Joulean temperature rise is less, thus lessening the need for supplementary fan cooling (or slip agents) to keep the temperature sufficiently low not to induce crystallisation of the polymer composition.

The coating may suitably comprise a carbon-containing non-stick coating such as a fluorocarbon material. The coating is suitably applied to the screw in conventional manner. A primer may in each case precede the coating for purposes of e.g. adhesion and serviceability of the coating and to impart such properties as resilience.

It is preferred that substantially all surfaces of the screw with which the composition comes into contact are coated with the adhesion-reducing coating. In this way, shear-sensitive polymers such as polyvinyl alcohol (PVOH) can be processed in a very much gentler manner than hitherto, by an action which is believed to resemble "rolling" it in the flights of the screw as the screw rotates in the barrel and the composition, like dough, passes through the barrel without drag or whirlpooling, so avoiding the dangers of uncontrolled degradation caused by excessive shear, to which, as explained, such polymers can be especially prone.

In one particular form, the barrel wall of the extruder may, additionally or alternatively, be coated over at least part of its surface with an adhesion-reducing coating, suitably of a similar type to those coatings mentioned above, preferably being slightly resilient, and serviceable up to at least 300° C. Preferably the barrel wall is not coated, or, if coated, has a dynamic coefficient of friction against PVOH exceeding that of the screw.

In a further aspect the present invention provides a method and apparatus for delivering an extrudable organic polymer composition to a die or mould, wherein one or more extrusion screws is/are rotatably housed within a barrel and temperature control means are provided for maintaining the barrel at a controlled temperature or series of temperatures along its length, the arrangement being such that the majority of the heat energy acquired by the composition within the barrel is from external heating via the temperature control means.

This is made possible through the unconventional mode of operation of apparatus according to the invention. As a conventional screw turns, polymer tends to bond to both the barrel and the screw, and the work done in turning the screw against this bonding is used up in shearing and ripping apart the polymer, warming the same. As, in the present apparatus, polymer does not bond to the (coated) screw, its processing takes the form of a rolling or kneading action, which dissipates minimal energy in ripping polymer; the necessary softening temperature may be maintained by externally applied heat, which is preferred as being more controllable, predictable and uniformly dispersed throughout the polymer than is conventional internally generated heat. Restating the above definition in different words, the ratio (internally generated heat)/(externally applied heat) is less than 1, preferably less than 0.1. The ratio should be as low as possible. In some examples of the prior art, the thermostats which are provided to "call" the externally applied heat never in practice do so, i.e. the said ratio is infinity, and sometimes indeed, in the prior art, cooling fans must be provided to remove excess internally generated heat.

The temperature should throughout exceed the so-called "decomposition temperature" (around 180° C. for a typical PVOH) and at its highest just exceed the "crystallite melting point" (typically 230° C.), i.e. by not more than preferably 3%, more preferably 1% on the absolute temperature scale, while preferably remaining below the cross-linking and chemical decomposition temperatures. PVOH has the idealised

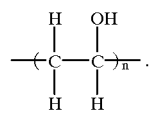

The present invention is applicable to the extrusion or moulding of PVOHs, for example hot-water soluble (fully hydrolysed) PVOHs, and can improve the workability of such polymers in a wide range of dies and moulds (which may if desired likewise be of inherently non-stick slippery materials or coated to achieve the same effect), such as "spider" dies, "widows peak" dies and cast extrusion dies for single-film extrusions, coextrusion dies, for example of the types described in our already mentioned application No. WO 93/22125 (the disclosure of which is incorporated herein by reference), or in injection moulding, blow moulding, vacuum moulding and expansion (e.g. foaming) moulding.

Preferably the composition before the method comprises from 13 to 27 wt % plasticisers, preferably 10 to 20% glycerol and 3 to 7% water, and in the method (i) the swellability of the composition before the method when moulded at 225° C. then stored in water at room temperature for 48 hours does not exceed 110% of the swellability of the composition after the method, and/or (ii) the proportion of water-soluble material in the composition, after the swelling in (i) and drying, falls by less than half in the course of the method, and/or (iii) the mass flow rate of the composition is improved by at least 5% by the method, and/or (iv) the Mn molecular weight of the composition is not increased by more than 10% by the method. It is preferred that the residence time of the polymer composition in the barrel of the feed screw be relatively long, e.g. at least 1 minute, compared with other plastic materials fed through conventional general purpose screws or screws used in the extrusion of polypropylene or polyethylene.

After the feed zone, the barrel is suitably maintained at different temperatures along its length in a series of temperature zones. In the first three or four zones, for example, which can extend over at least half of the length of the barrel, the temperature is gradually increased from one zone to the next. Thereafter, a compression zone is suitably provided, whereby the root diameter of the screw shaft is increased and/or the pitch of the screw(s) is decreased, extending over one or more (suitably about 3 or 4) flights of the screw(s). The maximum temperature in the barrel is suitably reached at or about the compression zone, and may be from 1 to 3% higher (absolute temperature scale) than on leaving the temperature-increase zone. The volume of the composition is suitably reduced by, for example, one-third in the compression zone, that is, a 1 ml element in a continuous stream of feedstock will be constrained to occupy only $2/3$ ml when it has reached the compression zone. This volume reduction is a measure of the harshness of the processing and therefore preferably does not exceed 50%.

After the compression zone, a devolatilisation zone is preferably provided, in which the composition is allowed to expand substantially over one or more (suitably about 2 or 3) flights of the screw(s), the temperature being held about the same (within preferably 3% e.g. within 1%) as in the compression zone. The material can thus expand to its natural extent, sufficient spare volume being allowed for this. Gases are suitably vented off from the devolatilisation zone, optionally by a vacuum extractor.

Accordingly, the devolatilisation zone is preferably sufficiently capacious that material in it is not under any compression, and therefore preferably the thread depth and/or the pitch of the screw is larger in the devolatilisation zone than in the feed zone.

Downstream of the devolatilisation zone a pump zone may suitably be provided, over one or more (suitably about 5 or 6) flights of the screw, whereby the composition is carried forward out of the barrel towards the die inlet with no compression and with no temperature variation beyond 3% from the compression zone. The screw preferably projects (by e.g. $1/4$ to 1 pitch) beyond the end of the barrel to push the material out and a "nose" is preferably provided so as to avoid sticking, "spiralling" or a whipping coring effect.

The screw speed should not be too high or shearing and overworking of the composition may result. For a single-screw extruder, a screw speed of up to about 50 r.p.m. is suitably used, for example between about 15–20 r.p.m.

It is found that the present invention leads to a system which is effectively self-purging. This avoids the need to introduce thermoplastic purgatives or other abrasive materials on shutdown of the screw or barrel, eliminating the risk of damage to the coating and reducing cleaning times.

In a still further aspect of the present invention, a die assembly through which the composition is extruded has over at least a part of its internal surface a friction-reducing surface. It is preferred that substantially all surfaces of the die assembly with which the extrudable composition comes into contact are friction-reducing. This is most easily achieved by suitable coating. The die assembly (including any adaptor at its start) preferably never narrows or widens by any angle exceeding 40° (e.g. 25°) (cone half-angle) except at its exit, i.e. the prior art "pepper pot" is omitted, the extra working imposed by the pepper-pot being now found unnecessary and indeed deleterious. The screw, if it projects beyond the end of the barrel as suggested above, would thus project into the die assembly in this case, in particular into the adaptor if present.

It has been found that the present invention enables sensitive polymers such as PVOHs to be worked continuously into high-quality sheets, films and other forms. One such form which may particularly be mentioned is continuous fibre(s) for pelletisation, which can be extruded continuously through an orifice (say 6 mm diameter), hauled off (drawing it to say 3 mm diameter), cooled and pelletised by cutting blades in conventional manner. The polymer pellets are found to be stable for storage and transportation, and appear to have substantially reduced gaseous inclusions. The fibre/pellets material is uniquely characterisable as having any one or more of the following properties:

(i) it contains no additives other than colourant, silica, glycerol and/or water;

(ii) after moulding at 225 ° C. and storing in distilled water at room temperature for 48 hours its swelling exceeded 40% (preferably 42%);

(iii) after swelling as in (ii) and drying, it contains from 5.8% to 6.6% (preferably 6.0% to 6.4%) by mass of water-soluble material;

(iv) at 225° C. under a nominal load of 10 kg and through a die of diameter 4.2 mm, its mass flow rate is at least 20 g/min.

The invention accordingly extends to PVOH per se having such properties, being a new substance, which has important industrial advantages. The pellets can be re-extruded or moulded at a later time, preferably using standard thermoplastic screw equipment in which the screws are coated over at least part of their surface with an adhesion-reducing coating in accordance with the present invention, or even more preferably in standard un-coated equipment, standard except that preferably, if a spider die is used, the die continues downstream after the spider for at least ten e.g. at least fifty times the composition thickness (in order that the composition weld itself effectively together after the spider). The pellets (and the precursor fibre) are characterised by not thickening, or not becoming thixotropic, when extruded in a standard uncoated screw.

The invention further provides polyvinyl alcohol in the form of fibre or chopped fibre, i.e. it has been extruded, in which fibre no carbon-carbon double bonds are detectable by $^{13}C$ n.m.r. Such double bonds result from thermal dehydration of the polymer backbone and are the precursor to cross-linking. Their absence in an already extruded product therefore indicates a uniquely mild processing history as well as implying no cross-linking. This product is therefore exceptionally suitable for further processing. It may, furthermore, have any one or more of the following properties:

(i) it contains no additives other than colourant, silica, glycerol and/or water;

(ii) after moulding at 225° C. and storing in distilled water at room temperature for 48 hours its swelling exceeded 40% (preferably 42%);

(iii) after swelling as in (ii) and drying, it contains from 5.8% to 6.6% (preferably 6.0% to 6.4%) by mass of water-soluble material;

(iv) at 225 ° C. under a nominal load of 10 kg and through a die of diameter 4.2 mm, its mass flow rate is at least 20 g/min.

The PVOH composition used may be that described in WO 93/22125.

BRIEF DESCRIPTION OF THE DRAWINGS

The invention will now be described by way of example with reference to the accompanying drawings, in which.

DETAILED DESCRIPTION OF THE INVENTION

In the apparatus described, polyvinyl alcohol of either of two grades may be extruded. Both, when brought together to form a bilayer film, offer a material with useful packaging and biodegradability properties. The grades are:

| (a) | Cold-water soluble | |
|---|---|---|
| | Mowiol 26-88 | 100 parts by weight |
| | Glycerol (food grade glycerine) | 15 parts |
| | Distilled Water | 5 parts |
| | Silica (very high surface area) and | ¼ part |
| (b) | Hot-water soluble | |
| | Mowiol 28-99 | 50 parts by weight |
| | Mowiol 56-98 | 50 parts |
| | Glycerol (food grade glycerine) | 20 parts |
| | Distilled Water | 5 parts |
| | Silica (very high surface area) | ¼ part |

"Mowiol" is a trade mark of Hoechst and is polyvinyl alcohol. The index numbers "26", "28" are the viscosity (in mPa.s of a 4% aqueous solution at 20° C.) and "88", "98" and "99" refer to the degree of hydrolysis of the respective grade, i.e. percentage of X groups which have been hydrolysed of the precursor compounds $-(CH_2- CHX)_n$ on which the PVOH is notionally or actually based. Degree of hydrolysis preferably exceeds 85 for cold-water-soluble product and 97 for hot-water-soluble product.

The components should be blended in the order given, at above their melting point but taking care not to exceed (a) 73° C. or (b) 110° C.

Unlike some prior-art formulations for making PVOH extrudable, all these components are non-toxic and harmless to the environment.

The product, which is in the form of crumb (granules), is cooled to about 30° C., passed through a 1 mm sieve and used immediately or within 48 hours (unless packed in vacuum sealed containers).

Figures 1A, 1B:
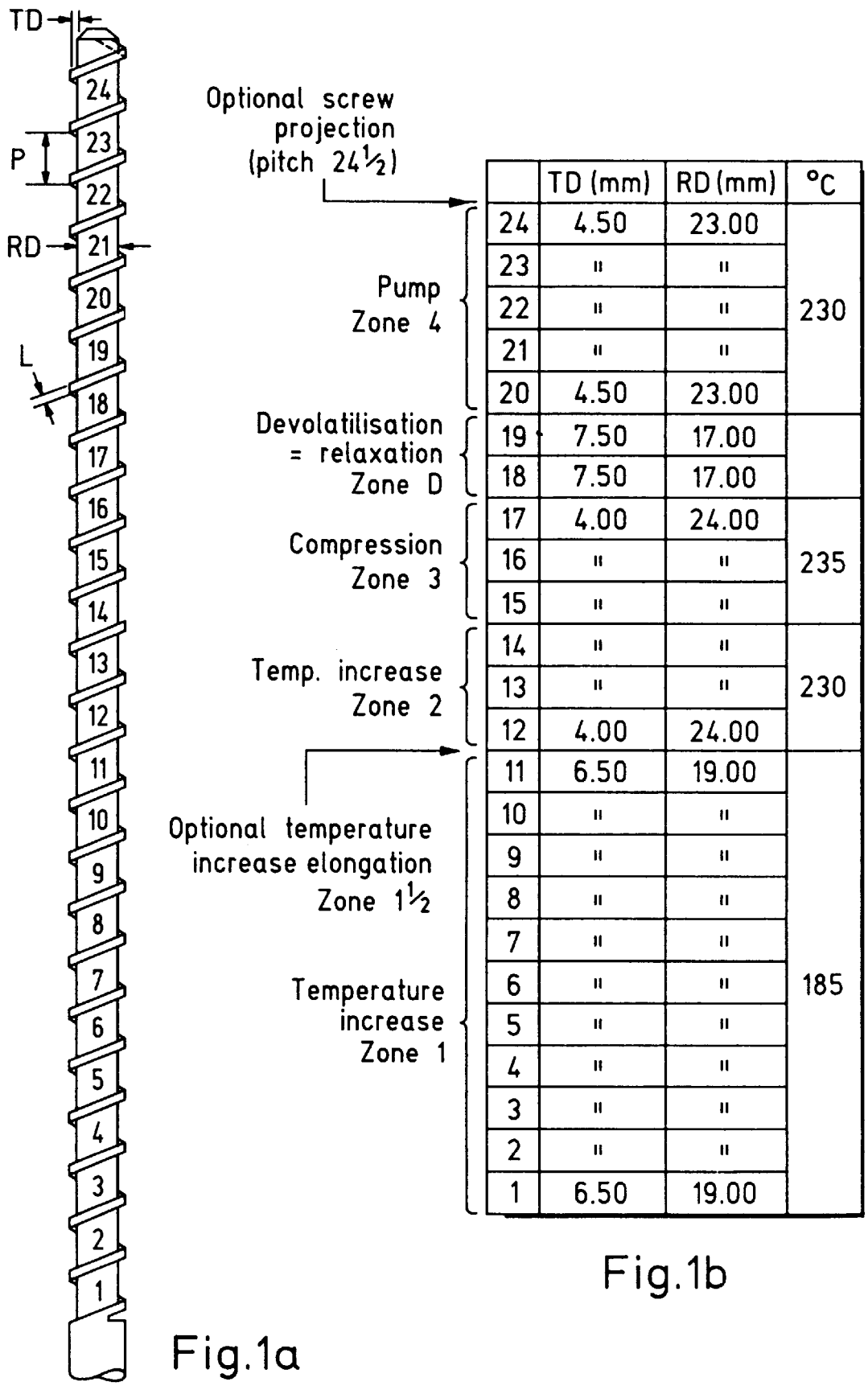
FIGS. 1a and 1b illustrate a single screw feeder coated with a non-stick coating (not shown), with FIG. 1a indicating the numbering convention for each flight of the screw and FIG. 1b comprising a table showing the thread depth and root diameter for each flight and example temperatures.

The product is passed via a twin-screw metered feeder into a barrel-and-screw extruder of which the screw is as illustrated in FIG. 1. A single-start screw, 24 pitches long (each pitch repeat distance P=32 mm and outside diameter= 32 mm), has threads of fixed land L=6 mm but variable thread depth TD and root diameter RD and rotates at 15 or 20 r.p.m. Numbering the pitches from 1 at the inlet to 24 at the outlet, TD and RD and the process temperatures are as tabulated in FIG. 1(b).

The earlier mixing, from about pitches 1 to 11, has an action on the crumb similar to that of kneading dough, and takes place anadiabatically, that is, with external heat being supplied to maintain temperature, the mechanical work supplied by the screw being much less than would be required to reach the desired temperatures set forth in FIG. 1(*b*). The longer the "cooking", the better the final product, hence the suggestion in FIG. 1(*b*) of an extra zone 1½ for longer temperature increase. Zone 1½, if present, would for example take up six extra new pitches 11A, 11B . . . 11F between 11 and 12. The residence time of composition in the barrel is as long as 2 to 3 minutes, because the composition tends to knead itself in the opposite direction to the forward screw transport. Long residence times (slow heating, gentle working) seem advantageous.

Figure 2:
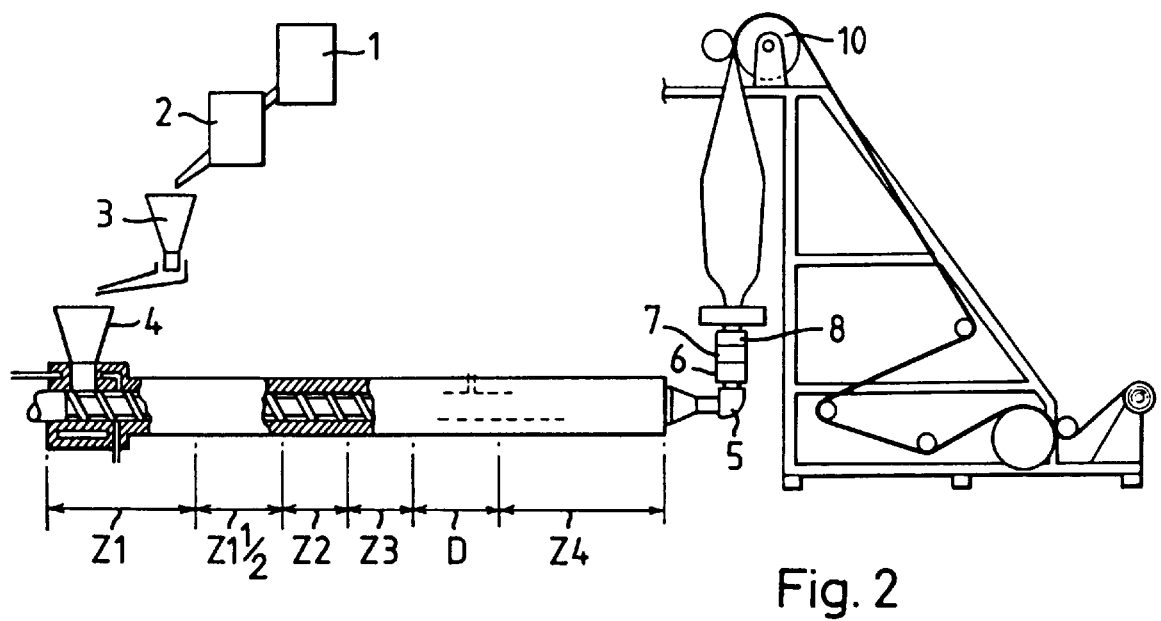
FIG. 2 shows an extrusion line suitable for polyvinyl alcohol.

FIG. 2 shows a typical polyvinyl alcohol extrusion line, in which the processed PVOH moves through a die assembly comprising an adaptor zone 5 and die zones 6, 7 and 8 (all four at 230° C.), with individual heaters and coolers as necessary to maintain these temperatures (including those shown on FIG. 1). The die is coated with friction-reducing i.e. "slippery" fluorocarbon of a grade which would be suitable for commercial fast-food bun baking. (For such an application, low friction is needed, as is durability to 230° C., but not great abrasion-resistance, as bun dough has negligble abrasive effect.) Unsuccessful coatings were those which could not withstand 230° C. Because the coating had a coefficient of friction of 0.12 (dynamic) with respect to PVOH, and an unmeasurably small room temperature pull-off adhesion bond strength to cast PVOH (less than 50 N per square inch and probably less than 50 kPa, so low that peel tests could not meaningfully be carried out) and the PVOH is anyway soft at the 230° C. operating temperature, mechanical abrasion resistance is not an important property for this coating.

The screw is coated with a proprietary fluorocarbon-based aqueous resin dispersion medium to a wet thickness of about 100μm, which is dried for 5 minutes at 90° C. and then cured for 5 minutes at 400° C. to form a 20–200 μm e.g. 20–25 μm abrasion-resistant (=to commercial fast-food chicken-baking standards), adhesion-reducing non-stick (adhesion at room temperature to cast PVOH is unmeasurably small, less than 50 kPa) smooth satin waxy-feel fluorocarbon polymer whose μ (dynamic) measured against PVOH at room temperature is 0.10 and which is serviceable up to 250° C. Alternative coatings are possible, but the primers and coatings should not soften below 240° C. Proprietary primers for such purposes, often in liquid form, being in general circulation, the most suitable primers and coatings are selected by trial and error. A further alternative is solid material inherently having these surface properties.

Adhesion strengths throughout this specification are measured by a pull-off test based on BS EN 26932:1993. Two 25 mm wide strips of samples whose adhesion to PVOH is to be tested were bonded using PVOH to form a cross. Test surfaces were degreased with toluene prior to formation of the bond. The strips were placed, test face upwards, on a hotplate controlled at 295±15° C. for 5 minutes. Polyvinyl alcohol powder was sprinkled onto the surface to be bonded. Heating was continued for a further 3 minutes. The joint was made and the specimen was removed from the hotplate. Immediately on removal, sufficient pressure was applied to the joint area to cause softened polyvinyl alcohol to exude from the joint. The assembly was allowed to cool to room temperature. Bond strength was determined using a Lloyd LR30K tensometer under the following conditions:

| | |
|---|---|
| Ambient temperature | 22° C. |
| Ambient humidity | 44% |
| Cross-head separation | 6 mm/min |
| Polyvinyl alcohol thickness in joint | 1.3 ± 0.3 mm |

All samples failed adhesively at a PVOH-substrate interface, i.e. none failed cohesively. The samples referred to as "under 50 kPa" were so weakly adhered that they failed upon the slightest handling.

Crumb prepared as described previously in processing vessels 1 and 2 is passed to a metered feeder 3, from which it is fed at 77 g/min into a hopper 4 feeding into the single or twin screw, which rotates at 20 r.p.m. The screw's zones 1, 1½, 2, 2, 3, D and 4 are shown, and a final extra half-pitch is provided on the screw for a tidy removal of the processed material, the material taking 2 to 3 minutes to traverse the whole.

Thereafter, the material is passed through a coated adaptor 5 offering low resistance and thence through a three-part coated die 6, 7, 8, all held at 230° C., for making internally inflated tube ("blown film") of thickness about 100 microns.

Similar results are obtainable by rotating the screw at 16 r.p.m. and varying the temperatures thus: Zone 1=190° C.; Z2=225° C.; Z3=235° C.; Z4=225° C.; 5, 6 and 7=230° C.; 8=225° C. Trial and error may optimise these temperatures for different grades of PVOH.

The blown film 9 is drawn off by nip rollers 10 set to maintain an appropriate tension, and wound conventionally.

As an alternative to the single screw illustrated in FIG. 1, a twin-screw extruder may be used, and FIG. 2 shows an extrusion line according to the invention with a twin-screw extruder. The two screws are coated identically to that of FIG. 1 and have identical constant pitch (43.7 mm). Counting from the feed end,

| Pitches Nos. | Equivalent on Figure 1 | TD (mm) |
|---|---|---|
| 1–7 | Temperature Increase Zone 1 | 24 |
| 8–11 | Zone Elongation 1 ½ | 24 |
| 12–14 | Temperature Increase Zone 2 | 24 |
| 15–17 | Compression Zone 3 | 16 |
| 18–21 | Devolatilisation Zone D | 36 |
| 22–25/26 ) | | ( 24 |
| ) | Pump Zone 4 | ( |
| 26/27–29 ) | | ( 16 |

Each Zone is held at the same temperature as in FIG. 1*b*.

Figure 3:
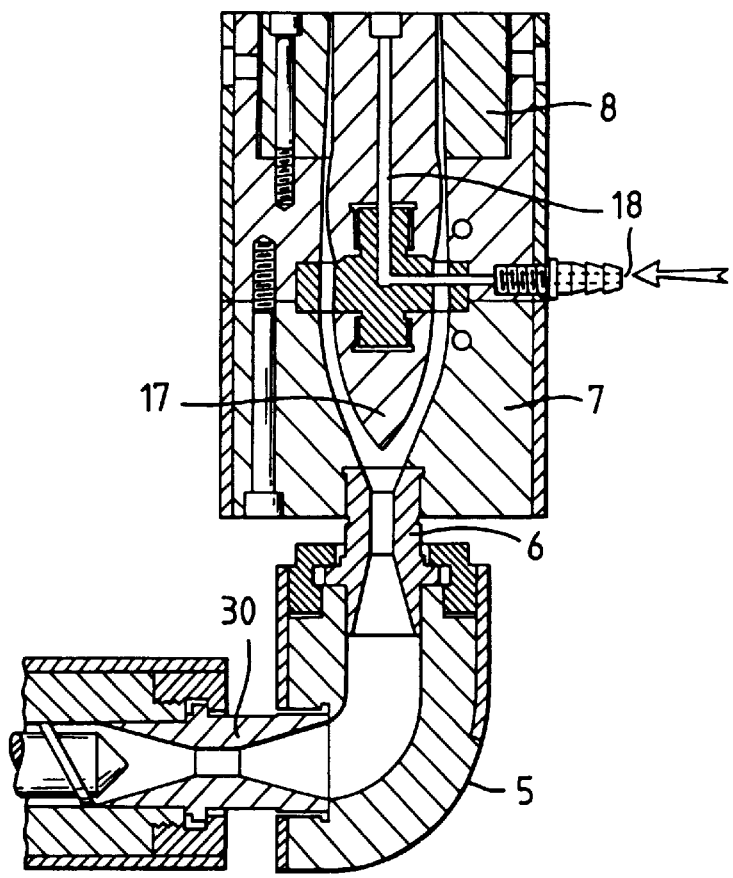
FIG. 3 shows the end of the extruder with a die assembly comprising an adapter and spider die.

FIG. 3 shows the end of the extruder with a die assembly comprising an adaptor and spider die for making tubular film. The end of the screw of FIG. 1(*a*) is shown, with the optional extra half-pitch projecting from the barrel omitted.

The processed composition passes through an extruder 30 coated with non-stick fluorocarbon and not converging nor diverging from cylindricality by more than 20° (cone half-angle). The extruder 30 leads to a likewise internally coated adaptor 5, leading to a die bottom zone 6 with similar mild convergences and divergences. This ensures that the minimum mechanical work is done on the composition, contrary to those teachings of the prior art which advocate strong repeated compressions and decompressions.

The die bottom zone 6 gives onto a die middle zone 7 including a mandrel 17 in which an air pressure duct 18 is drilled. After passing this zone, composition which has emerged from the extruder 30, adaptor 5 and die zone 6 moves to a die top zone 8 equipped with centering adjustments to ensure that the thickness of composition is constant all round the mandrel. Upon emerging from the zone 8, the composition, now a tubular film of wall thickness about 100 microns, is maintained by air pressure from the duct 18 as an inflated tube, until it cools by external air cooling. The temperatures of the zones are as given in FIG. 1(*b*).

It will be understood that, instead of film being made from the composition, 6 mm-diameter fibre could be extruded by adapting the extruder 30; such fibre can be pulled to 3 mm diameter and chopped into pellets for further processing. $^{13}$C nuclear magnetic resonance detected no carbon-carbon double bonds in the pellets. The further processing of the pellets can be in apparatus according to FIG. 3 but this time without the internal non-stick fluorocarbon screw coatings, in other words now using completely standard film-making plant for the reprocessing of pellets into film except that the die would have to have a slippery coating as described.

It is found that the 3 mm pellet diameter allows for a relatively rapid melting of the polyvinyl alcohol despite its low heat conductivity. Making 3 mm fibre directly, however, requires fine extrusion dies which themselves could adversely affect the properties of the polyvinyl alcohol being forced through, and for this reason the desirable 3 mm pellet is made by extruding to 6 mm diameter fibre and then drawing down. The maximum temperature previously reached by the polyvinyl alcohol (in this case 230/235° C., and preferably not more than 240° C.) should however not be exceeded when reprocessing (e.g. injection-moulding or extruding) the pellets e.g. into film, such temperature control ensuring that no further gases are released.

Where polyvinyl alcohol (with only glycerol, water and silica as additives) is attempted to be extruded using conventional steel dies and screws with no specially treated surfaces, the product is partly cross-linked with a stiff rubbery feel. When extruded using treated surfaces as set forth above, the product feels not unlike polyethylene. By adjusting the adhesion and friction characteristics of the various working surfaces of the apparatus to intermediate values, product with intermediate properties may be obtained if required.

I claim:

1. An extrusion apparatus comprising a die and a barrel screw feeder for delivering an organic polymer composition through the die, wherein the screw exhibits less adhesion to the composition than does the barrel and wherein the die has a friction-reducing surface, said screw having a dynamic coefficient of friction against polyvinyl alcohol lower than that of the die.

2. An apparatus according to claim 1, wherein the screw has over at least part of its surface a room temperature adhesion strength to polyvinyl alcohol cast thereon of less than 200 kPa.

3. An apparatus according to claim 1, wherein the screw surface is of a fluorocarbon material.

4. An apparatus according to claim 1, wherein the screw surface is serviceable up to 240° C.

5. Apparatus according to claim 1, further comprising a gas outlet part way along the barrel, and wherein the screw is shaped such that material conveyed by the screw can occupy a greater volume when passing the gas outlet than when first fed to the screw, the screw further being shaped to provide an intervening compression.

6. Apparatus according to claim 1, wherein the die is non-stick and lubricious.

7. Apparatus according to claim 6, wherein the coefficient of dynamic friction of the screw and/or of the die against polyvinyl alcohol at room temperature is less than 0.2.

8. Apparatus according to claim 1, further comprising temperature control means for maintaining the apparatus at a controlled temperature or series of controlled temperatures along its length.

9. A method of processing an organic polymer composition, or of delivering an extrudable organic polymer composition to a die or mould, comprising introducing the composition to the upstream end of a barrel screw feeder apparatus according to claim 1.

10. A method according to claim 9, wherein heat energy is applied to the apparatus in order to keep the composition warm during the method.

11. A method according to claim 10, wherein the ratio (internally generated heat)/(eternally applied heat) is less than 1.

12. A method according to claim 9, wherein the organic polymer composition is susceptible to cross-linking.

13. A method according to claim 9 in which the organic polymer composition comprises polyvinyl alcohol.

14. A method according to claim 13, in which heat energy is applied to generate a temperature exceeding the decomposition temperature and the crystallite melting point but below the cross-linking and chemical decomposition temperatures.

15. A method according to claim 14, wherein the composition before introduction to the apparatus comprises from 13 to 27 wt % plasticizers and 3 to 7% water, and wherein the composition has the property that the composition has a swellability before introduction to the apparatus when molded at 225° C. then stored in water at room temperature for 48 hours which not exceed 110% of the swellability of the composition after having passed through the die.

16. A method according to claim 10, wherein the residence time of the polymer composition in the barrel of the apparatus is at least 1 minute.

17. A method according to claim 9, further comprising extruding the processed composition through a die to form fibre or film.

18. A method according to claim 9, wherein the composition is fed to the upstream end of the barrel screw feeder apparatus at a sufficiently low rate to occupy not more than half the available volume at the start of the screw.

19. A method according to claim 15 wherein the composition further comprises 10 to 20% glycerol.

20. A method according to claim 15, wherein the fiber is chopped into pellets.

21. A method of processing an organic polymer composition, or of delivering an extrudable organic polymer composition to a die or mold, comprising introducing the composition to the upstream end of a barrel screw feeder apparatus for delivering an organic polymer composition to a die or mold, said apparatus comprising a screw exhibiting less adhesion to the composition than the barrel; and applying heat energy to the apparatus in order to keep the composition warm;

wherein the ratio (internally generated heat)/(externally applied heat) is less than 1.

22. A method of processing an organic polymer composition, or of delivering an extrudable organic polymer composition to a die or mold, comprising:

introducing the composition to the upstream end of a barrel screw feeder apparatus comprising a screw exhibiting less adhesion to the composition than the barrel;

applying heat energy to the apparatus to keep the composition warm;

wherein the residence time of the polymer composition in the barrel is at least one minute.

23. A method of processing an organic polymer composition, or of delivering an extrudable organic polymer composition to a die or mold, comprising:

introducing the composition to the upstream end of a barrel screw feeder apparatus comprising a screw exhibiting less adhesion to the composition than the barrel; and applying heat energy to the apparatus to keep the composition warm;

wherein the composition is fed to the upstream end of the barrel screw feeder apparatus at a sufficiently low rate to occupy not more than half the available volume at the start of the screw.

* * * * *

UNITED STATES PATENT AND TRADEMARK OFFICE

CERTIFICATE OF CORRECTION

PATENT NO. : 6,080,346
DATED : June 27, 2000
INVENTOR(S) : JACK, Raymond L.

It is certified that error appears in the above-identified patent and that said letters patent is hereby corrected as shown below:

Front face of the patent, left-hand column under "[73]" delete "British Technology Group Inter-Corporation LIC LIM" and replace by -- British Technology Group Inter-Corporate Licensing Limited --.

Signed and Sealed this

Third Day of April, 2001

*Attest:*

NICHOLAS P. GODICI

*Attesting Officer*    Acting Director of the United States Patent and Trademark Office